United States Patent
Ono et al.

(10) Patent No.: US 10,763,527 B2
(45) Date of Patent: Sep. 1, 2020

(54) FUEL CELL DEVICE

(71) Applicant: KYOCERA CORPORATION, Kyoto-shi, Kyoto (JP)

(72) Inventors: Takashi Ono, Kirishima (JP); Mitsuhiro Nakamura, Kirishima (JP); Naruto Takahashi, Kirishima (JP)

(73) Assignee: KYOCERA CORPORATION, Kyoto-shi, Kyoto (JP)

( * ) Notice: Subject to any disclaimer, the term of this patent is extended or adjusted under 35 U.S.C. 154(b) by 150 days.

(21) Appl. No.: 16/181,514

(22) Filed: Nov. 6, 2018

(65) Prior Publication Data
US 2019/0074531 A1 Mar. 7, 2019

Related U.S. Application Data

(62) Division of application No. 13/387,499, filed as application No. PCT/JP2010/062821 on Jul. 29, 2010, now Pat. No. 10,164,276.

(30) Foreign Application Priority Data

Jul. 29, 2009 (JP) .................. 2009-176296

(51) Int. Cl.
*H01M 8/04791* (2016.01)
*H01M 8/04746* (2016.01)
*H01M 8/04858* (2016.01)
*H01M 8/04828* (2016.01)
(Continued)

(52) U.S. Cl.
CPC ..... *H01M 8/04805* (2013.01); *H01M 8/0491* (2013.01); *H01M 8/0494* (2013.01);
(Continued)

(58) Field of Classification Search
CPC ......... H01M 8/04805; H01M 8/04619; H01M 8/04731; H01M 8/0618; H01M 8/04753;
(Continued)

(56) References Cited

U.S. PATENT DOCUMENTS

2005/0042485 A1 2/2005 Murayama
2005/0119842 A1 6/2005 Clingerman et al.
(Continued)

FOREIGN PATENT DOCUMENTS

EP 1453129 A1 9/2004
EP 1713141 A2 10/2006
(Continued)

*Primary Examiner* — Milton I Cano
*Assistant Examiner* — Philip A. Stuckey
(74) *Attorney, Agent, or Firm* — Viering, Jentschura & Partner MBB

(57) ABSTRACT

A fuel cell device is improved for operating conditions during a partial load operation. The fuel cell device comprises a cell stack formed by electrically connecting fuel cells for generating power by fuel gas and oxygen-containing gas; a fuel gas supply unit for supplying the fuel gas to the fuel cells; and a power adjustment unit for adjusting the amount of current that is supplied to an external load and a controller for controlling the fuel gas supply unit and the power adjustment unit. The controller adjusts, during the partial load operation of the fuel cell device and when the fuel gas supplied to the cell stack is at a low flow rate. The relationship between a fuel utilization rate of the cell stack and the amount of power generated by the cell stack can be nonlinear.

10 Claims, 4 Drawing Sheets

(51) Int. Cl.
*H01M 8/0612* (2016.01)
*H01M 8/04537* (2016.01)
*H01M 8/04701* (2016.01)
*H01M 8/124* (2016.01)

(52) U.S. Cl.
CPC ... *H01M 8/04619* (2013.01); *H01M 8/04731* (2013.01); *H01M 8/04753* (2013.01); *H01M 8/0618* (2013.01); H01M 8/04589 (2013.01); H01M 2008/1293 (2013.01); H01M 2250/405 (2013.01); Y02B 90/16 (2013.01)

(58) Field of Classification Search
CPC ............ H01M 8/0494; H01M 8/0491; H01M 2008/1293; H01M 2250/405; H01M 8/04589; Y02B 90/16
See application file for complete search history.

(56) References Cited

U.S. PATENT DOCUMENTS

| | | |
|---|---|---|
| 2009/0297900 A1 | 12/2009 | Higuchi |
| 2010/0167154 A1 | 7/2010 | Ono |

FOREIGN PATENT DOCUMENTS

| | | |
|---|---|---|
| JP | 2000-323157 A | 11/2000 |
| JP | 2003-123811 A | 4/2003 |
| JP | 2006-024478 A | 1/2006 |
| JP | 2006-032262 A | 2/2006 |
| JP | 2006-059550 A | 3/2006 |
| JP | 2006-302881 A | 11/2006 |
| JP | 2007-059377 A | 3/2007 |
| WO | 2007052633 A1 | 5/2007 |

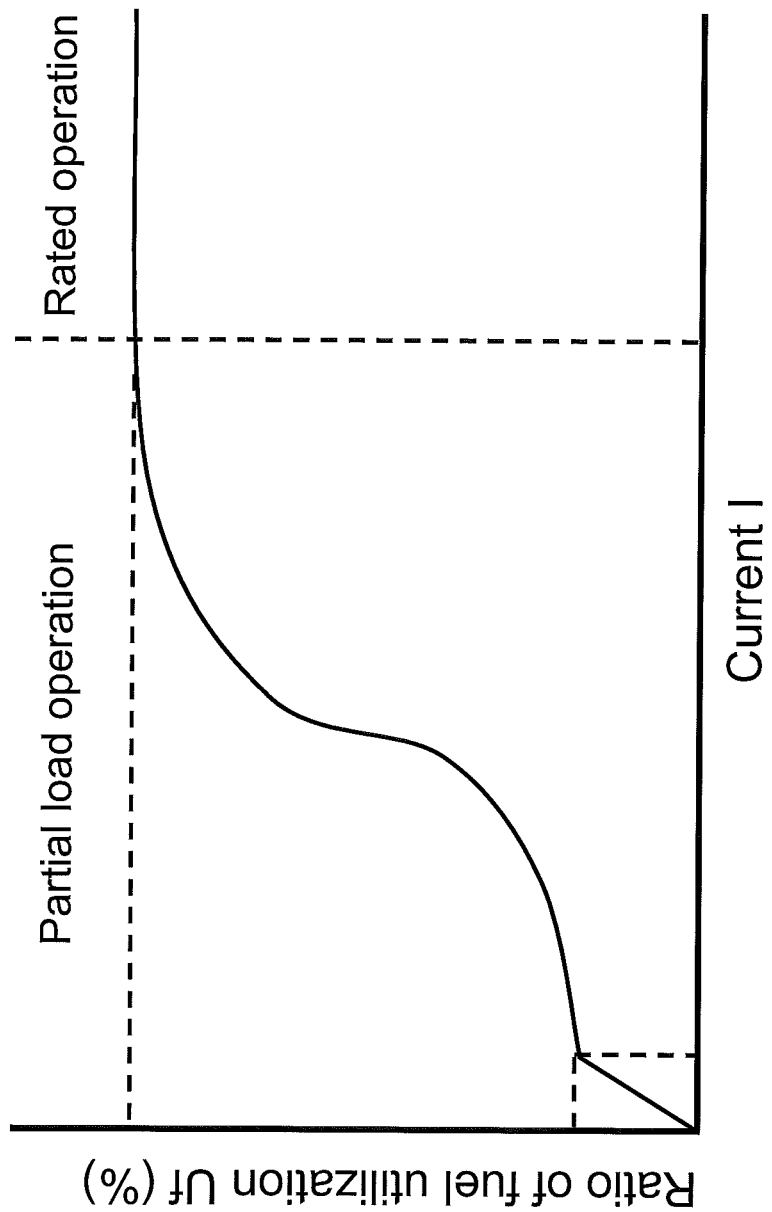

FUEL CELL DEVICE

CROSS-REFERENCE TO RELATED APPLICATION

This application is a Divisional of U.S. patent application Ser. No. 13/387,499, filed Jan. 27, 2012, now U.S. Pat. No. 10,164,276 B2, which is a national stage entry of the International Patent Application No. PCT/JP2010/062821, filed on Jul. 29, 2010, which claims priority to Japanese Patent Application No. 2009-176296, filed on Jul. 29, 2009, which are entirely incorporated herein by reference.

FIELD OF THE INVENTION

Embodiments of the present invention generally relate to fuel cell devices, and more particularly relate to a fuel cell device capable of operating a partial load operation.

BACKGROUND OF THE INVENTION

In recent years, fuel cell modules including a cell stack having a plurality of fuel cells arranged inside a housing container that are capable of generating power using fuel gas (gas containing hydrogen) and air (oxygen-containing gas) have been proposed as forms of next-generation energy. Various fuel cell devices including the fuel cell modules in an exterior case have been proposed.

Various kinds of fuel cells such as polymer electrolyte fuel cells (PEFC), molten-carbonate fuel cells (MCFC), phosphoric acid fuel cells (PAFC), solid oxide fuel cells (SOFC), and the like are known as such fuel cells; however, in particular, solid oxide fuel cells may easily follow partial loads for household use.

The partial load operation is generally known to decrease the amount of fuel gas supplied to the cell stack (fuel cells).

However, during the partial load operation of the fuel cell device, a rate of fuel utilization and amount of current (electric power generation) of the cell stack fluctuate (declined compared to during the rated operation) according to an external load.

Therefore, there is a need for a more efficient fuel cell device with improved operating conditions during the partial load operation.

SUMMARY OF THE INVENTION

A fuel cell device comprising a cell stack and methods are disclosed. The cell stack includes a plurality of fuel cells that is operable to generate power as a result of a reaction of a fuel gas and an oxygen-containing gas. A relationship between a rate of the fuel utilization of the cell stack and the amount of electrical current generated by the cell stack is controlled to allow the fuel cell device to have efficient partial load operation.

In one embodiment, a fuel cell device according to the present invention includes a cell stack, a fuel gas supply unit, a power conditioning unit and a controller. The cell stack comprises a plurality of fuel cells electrically coupled to generate power with a fuel gas and an oxygen-containing gas. The fuel gas supply unit supplies the fuel gas to the fuel cells. The power conditioning unit controls the amount of electrical current that is generated by the fuel cells and that is supplied to the external load. The controller controls the fuel gas supply unit and the power conditioning unit such that the relationship between a rate of the fuel utilization of the cell stack and the amount of electrical current generated by the cell stack is nonlinear if the fuel gas supplied to the cell stack is the minimum flow or more necessary for generating power during the partial load operation of the fuel cell device.

In another embodiment, a fuel cell device comprises: a cell stack comprising a plurality of fuel cells electrically coupled, and operable to generate electrical current from a reaction of a fuel gas and an oxygen-containing gas; and a controller operable to maintain a relationship between a rate of fuel utilization of the cell stack and an amount of the electrical current non-linear during a partial load operation of the fuel cell device if the fuel gas flows into the cell stack at least a minimum flow necessary for generating power.

In a further embodiment, a method of operating a fuel cell device comprising fuel cells in a partial load operation is described. In the method, a fuel gas is supplied to the fuel cells at least a minimum flow necessary for generating power; an oxygen-containing gas is supplied to the fuel cells; an electrical current is generated at the fuel cells as a result of a reaction of the fuel gas and the oxygen-containing gas; and the relationship between a rate of fuel utilization of the fuel cells and the electrical current non-linear is maintained during a partial load operation.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the present disclosure. The figures are provided to facilitate understanding of the present disclosure without limiting the breadth, scope, scale, or applicability of the present disclosure.

FIG. 4 is a graph illustrating a relationship between a rate of fuel utilization of a cell stack and an amount of current generated by the cell stack according to the request of the external load in a fuel cell device according to an embodiment of a present invention.

DETAILED DESCRIPTION OF THE DRAWINGS

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Figure 1:
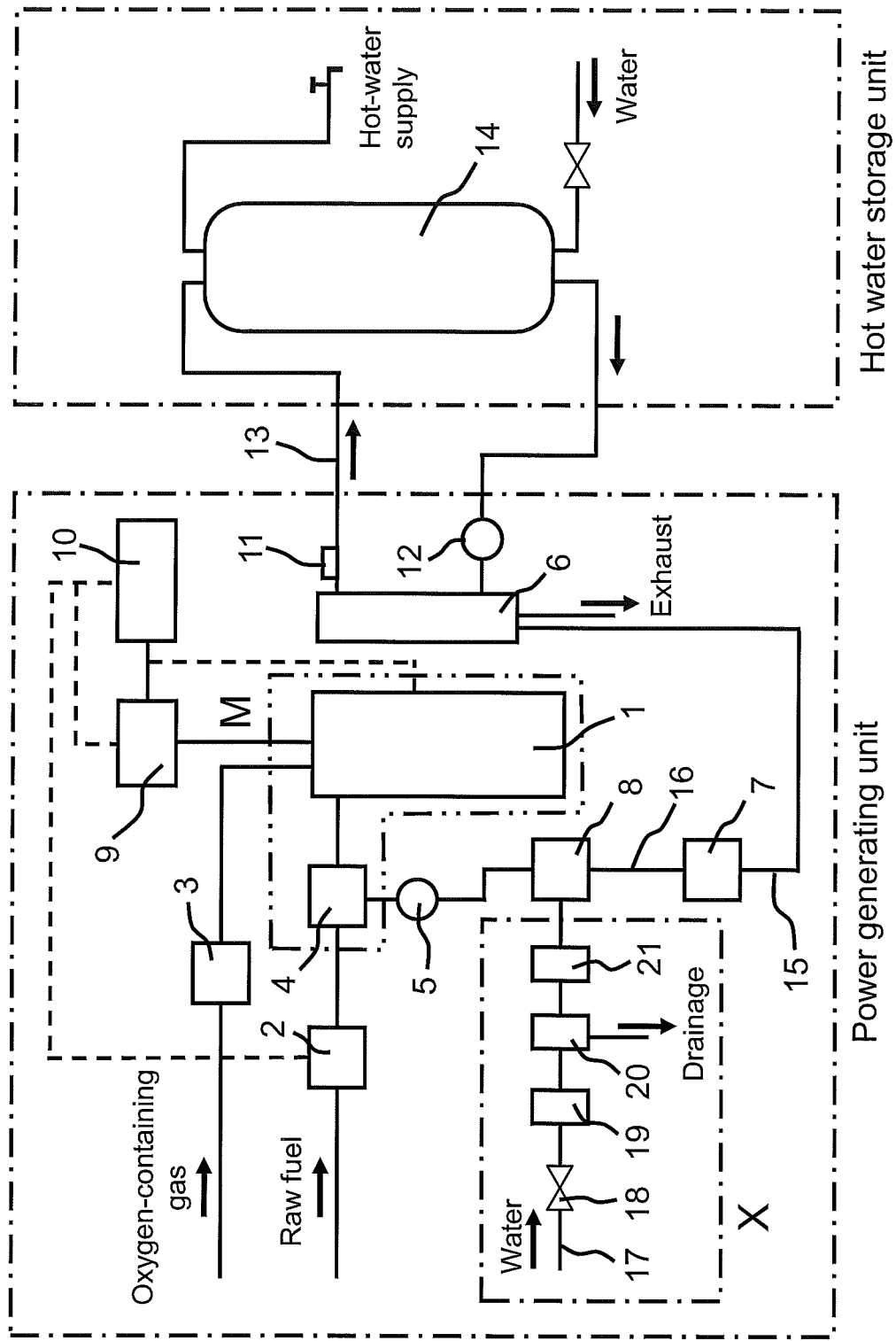
FIG. 1 is an illustration of an exemplary schematic diagram of a fuel cell system including a fuel cell device according to an embodiment of the present invention.

FIG. 1 is an illustration of an exemplary schematic diagram of a fuel cell system including a fuel cell device according to an embodiment of the present invention.

An embodiment of a fuel cell system illustrated in FIG. 1 may include a power generating unit to generate power, a hot water storage unit to store hot water obtained as a result of heat exchange, and a circulation pipeline to circulate water among these units.

The power generating unit illustrated in FIG. 1 may include a cell stack 1 including a plurality of fuel cells arranged and electrically coupled (not illustrated), a raw fuel supply unit 2 to supply raw fuel such as a natural gas and the like, an oxygen-containing gas supply unit 3 to supply oxygen-containing gas to the fuel cells constituting the cell stack 1, and a reformer 4 that carries out a steam-reforming reaction from the raw fuel as well as steam. The reformer 4 may include a vaporizing unit (not illustrated) to vaporize pure water supplied from a water pump 5 mentioned later and to mix the raw fuel supplied from the raw fuel supply unit 2 with the steam, and reforming within, and further may include a reforming unit (not illustrated) including catalyst therein to generate a fuel gas (hydrogen-containing gas) by reacting the mixed raw fuel with the steam. Thereby, the electric power is generated in the fuel cells (cell stack 1) by a reaction of the fuel gas generated at the reformer 4 and the oxygen-containing gas supplied from the oxygen-containing gas supplying unit 3. The fuel gas supply unit may include the raw fuel supply unit 2.

The cell stack 1 and the reformer 4 are located inside the housing container and are configuring a fuel cell module (hereinafter may be abbreviated as module). In FIG. 1, some units included in the fuel cell module are surrounded by dotted and dashed lines and M indicates the module. However, the reformer 4 may be provided outside of the housing container.

Here, the module M is described. Known fuel cell modules may be used for the module M. For example, in one embodiment, columnar-shaped fuel cells including a gas passage in which gas circulates inside are arranged inside the housing container in an up-right state, configuring the cell stack 1 by electrically connecting neighboring fuel cells in series via power-collecting members. Furthermore, the module M includes a cell stacking device and the reformer 4. In the cell stacking device, each bottom end of fuel cells is fixed to a fuel gas chamber with insulating bonding materials such as glass sealing material, and the like. The reformer 4 is located on or above the fuel cells to supply the fuel gas to fuel cells.

Various fuel cells are known as fuel cells constituting the cell stack 1; however, in conducting a partial load operation (load follow operation), solid oxide fuel cells may be selected. Auxiliaries necessary for the movement of fuel cells may be downsized by selecting solid oxide fuel cells as the fuel cells composing the cell stack 1, allowing the fuel cell device to be downsized.

The fuel cells may have various shapes such as flat types, cylindrical types, and the like. However, upon efficiently generating electric power at fuel cells, a hollow flat fuel cell may be selected. Fuel electrode-supporting type of hollow flat fuel cells with a fuel electrode layer formed to the inside and an oxygen electrode layer formed to the outside may be used as such hollow flat fuel cells.

The power generating unit, as illustrated in FIG. 1, may include a heat exchanger 6, a condensed water purifier 7 and a condensed water feeding tube 15. The heat exchanger 6 exchanges heat with an exhaust gas (exhaust heat) produced from the generation of electric power at fuel cells constituting the cell stack 1 and water flowing through a circulation pipeline 13. The condensed water purifier 7 purifies (preferably generates pure water) the condensed water generated from heat exchange. The condensed water feeding tube 15 supplies the condensed water generated at the heat exchanger 6 to the condensed water purifier 7 are formed. The condensed water processed at the condensed water purifier 7 is stored in a water tank 8 connected by a tank-connecting pipe 16 and subsequently supplied to the reformer 4 (vaporizing unit, not illustrated) by the water pump 5. The water tank 8 may be omitted by having the condensed water purifier 7 function as the water tank.

The power generating unit, as illustrated in FIG. 1, may include a power conditioning unit 9, an outlet water temperature sensor 11, a controller 10, and a circulating pump 12. The conditioning unit 9 converts direct-current power generated at the fuel cells into an alternating-current power and controls the amount of converted alternating-current power to the external load. The outlet water temperature sensor 11 is located at an outlet of the heat exchanger 6 and measures the temperature of water flowing through the outlet of the heat exchanger 6 (circulating water flow). The circulating pump 12 circulates water within a circulation pipeline 13. Then, the fuel cell device may include the cell stack 1, the controller 10, a fuel gas supplying unit to supply the fuel gas to the fuel cells and a power conditioning unit to control the amount of electrical current generated at the fuel cells and supplied to the external load.

In FIG. 1, the connection of a power conditioning unit 9 and the external load is omitted, and a power conditioner may be exhibited as an example of the power conditioning unit 9. Consequently, installation, carrying, and the like, may be simplified by housing each of these devices that constitutes the power generating unit inside the exterior case. The hot water storage unit may include a hot water storage tank 14 to store hot water after heat exchange.

Pollution-abatement equipment for exhaust gas (not illustrated), which processes the exhaust gas with the operation of the cell stack 1, is located between the cell stack 1 and the heat exchanger 6. In the pollution abatement equipment for exhaust gas, an exhaust gas processing unit is inside the housing container and a known combustion catalyst may be used as the exhaust gas processing unit.

Meanwhile, if an amount of condensed water supplied to the condensed water purifier 7 is small and/or if the condensed water processed at the condensed water processing unit is of low purity, water supplied from the outside (tap water or the like) may be purified and supplied to the reformer 4. In FIG. 1, external water purification equipment X including one or more water processing units to purify water supplied from the outside are equipped.

Here, the external water purification equipment X supplies the water from the outside to the reformer 4. The external water purification equipment X may include an ion-exchange resin unit 2, and may further include an activated charcoal filtering device 19 and/or a reverse osmosis unit 20. Then, the pure water generated at the water processing unit is stored in the water tank 8. The fuel cell device (power generating unit) illustrated in FIG. 1 may further include a feed valve 18 to adjust the amount of water supplied from the outside.

In FIG. 1, the external water purification equipment X is surrounded by a dashed line (indicated as X).

The external water purification equipment X may be omitted. Specifically, if the external water purification equipment X may be omitted if the water (pure water) necessary for the steam-reforming reaction at the reformer 4 is maintained by the condensed water alone generated from heat exchange between the exhaust gas (exhaust heat) produced by the power generation at the fuel cells and the water from a circulation pipeline 13.

Here, a method of operating the fuel cell device (power generating unit) illustrated in FIG. 1 is described. When carrying out steam reforming reaction in order to produce the fuel gas used for power generation at fuel cells, the condensed water produced by heat exchange between the exhaust gas produced by the operation of the cell stack 1 (fuel cells) at the heat exchanger 6 and the water flowing inside the circulation pipeline 13, is used as the pure water used in the reformer 4. The water flows inside the circulation pipeline 13 to increase water temperature due to heat exchange with the exhaust gas (that is to say, hot water), and then is stored in the hot water storage tank 14.

The condensed water produced at the heat exchanger 6 flows inside a condensed water supplying pipe 15 and is supplied to the condensed water purifier 7. The condensed water (pure water) processed at the condensed water purifier 7 (ion-exchange resin, and the like) is supplied to the water tank 8 through a tank connecting pipe 16. The water stored in the water tank 8 is supplied to the reformer 4 by the water pump 5. Then, steam reforming of the raw fuel supplied from the raw fuel supply unit 2 is carried out in the reformer 4 with the water. Consequently, the produced fuel gas is supplied to the fuel cells (cell stack 1).

Electric power is generated in the fuel cells (cell stack 1) with using the fuel gas supplied from the reformer 4 and the oxygen-containing gas supplied from the oxygen-containing gas supplying unit 3, and an electrical current generated at the fuel cells (cell stack 1) is supplied to the external load via an adjuster 9. Due to the methods mentioned above, autonomous water operation may be carried out by efficiently making use of the condensed water.

Outside water supplied from the outside (tap water and the like) may be used for the steam reforming. Specifically, the outside water may be used if little condensed water is produced or if the condensed water processed at the condensed water purifier 7 is of low purity.

In such cases, first, the feed valve 18 (for example, solenoid valve, air-driving valve, or the like) opens, and the outside water is supplied to the activated charcoal filter 19 via a water pipe 17. The water processed at the activated charcoal filter 19 is subsequently supplied to a reverse osmosis membrane 20. The water processed at the reverse osmosis membrane 20 is subsequently supplied to the ion-exchange resin unit 21. Then, the water purified at the ion-exchange resin unit 21 is stored in the water tank 8. The purified water (pure water) stored in the water tank 8 is used for generating electric power at the fuel cells (cell stack 1) by the method mentioned above.

In fuel cell devices having a configuration such as those mentioned above, the controller 10 controls the operation of the raw fuel supply unit 2 and the oxygen-containing gas supplying unit 3 during the rated operation, and supplies the amount of fuel gas and oxygen-containing gas necessary for rated operation to the fuel cells (cell stack 1). Thereby, a rated power is generated in the fuel cells (cell stack 1) and direct current flows in the fuel cells (cell stack 1). The electric power generated by the electrical generation at the fuel cells (cell stack 1) is supplied to the external load after being converted to alternating-current power at the adjuster 9. That is to say, the controller 10 controls each unit during the rated operation such that the relationship between a rate of fuel utilization (Uf) of the cell stack 1 and the amount of current (I) generated by the cell stack 1 becomes a constant rate in compliance with the demands from the external load.

When using the fuel cell device for household purposes, the required power of the external load is prone to fluctuate. The required power becomes higher particularly in the early morning and evening onwards, causing the electrical current flowing in the cell stack 1 to be higher; whereas, in the day time or at midnight, the required power becomes lower, causing the electrical current flowing in the cell stack 1 to be smaller.

Having the fuel cell device carry out the rated operation in a time zone with low required power may cause a reverse power flow of the electricity from the fuel cell device in the system power connected to the fuel cell device. Therefore, particularly in the operation of the fuel cell device for household purposes, the partial load operation (load follow operation) corresponding to the required power of the external load may be carried out.

During such a partial load operation, the controller 10 controls the operations of the raw fuel supply unit 2 and the oxygen-containing gas supplying unit 3, and supplies the amount of fuel gas and oxygen-containing gas necessary for obtaining an amount of current corresponding to the required power of the external load to the fuel cells (cell stack 1). The direct-current power resulting from the generation of electric power by the fuel cells (cell stack 1) is converted to alternating-current power at the power conditioning unit 9 and subsequently supplied to the external load.

That is to say, the rate of fuel utilization (Uf) and the amount of current (I) of the cell stack 1 fluctuates in correspondence with the required load during partial load operation. Specifically, the rate and the amount decline more compared to during the rated operation.

Figure 2:
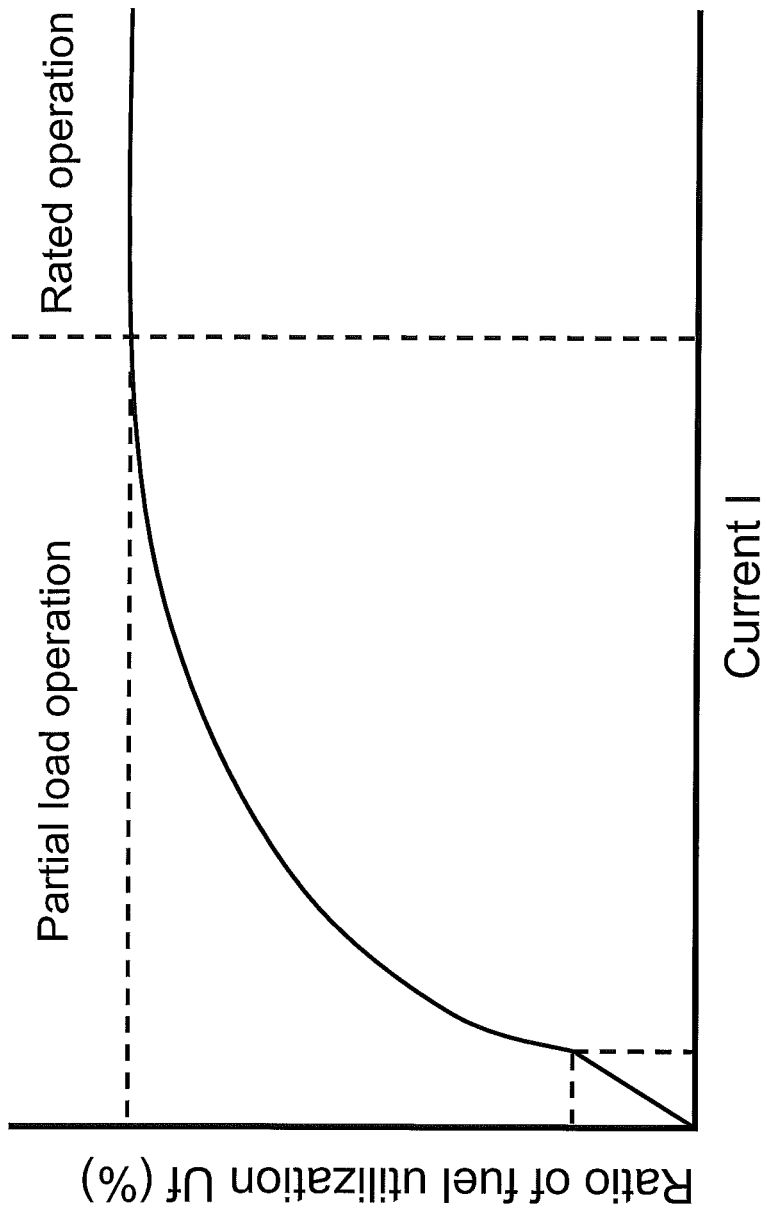
FIG. 2 is a graph illustrating a relationship between a rate of fuel utilization of a cell stack and an amount of current generated by the cell stack according to the request of the external load in a fuel cell device according to an embodiment of a present invention.
Figure 3:
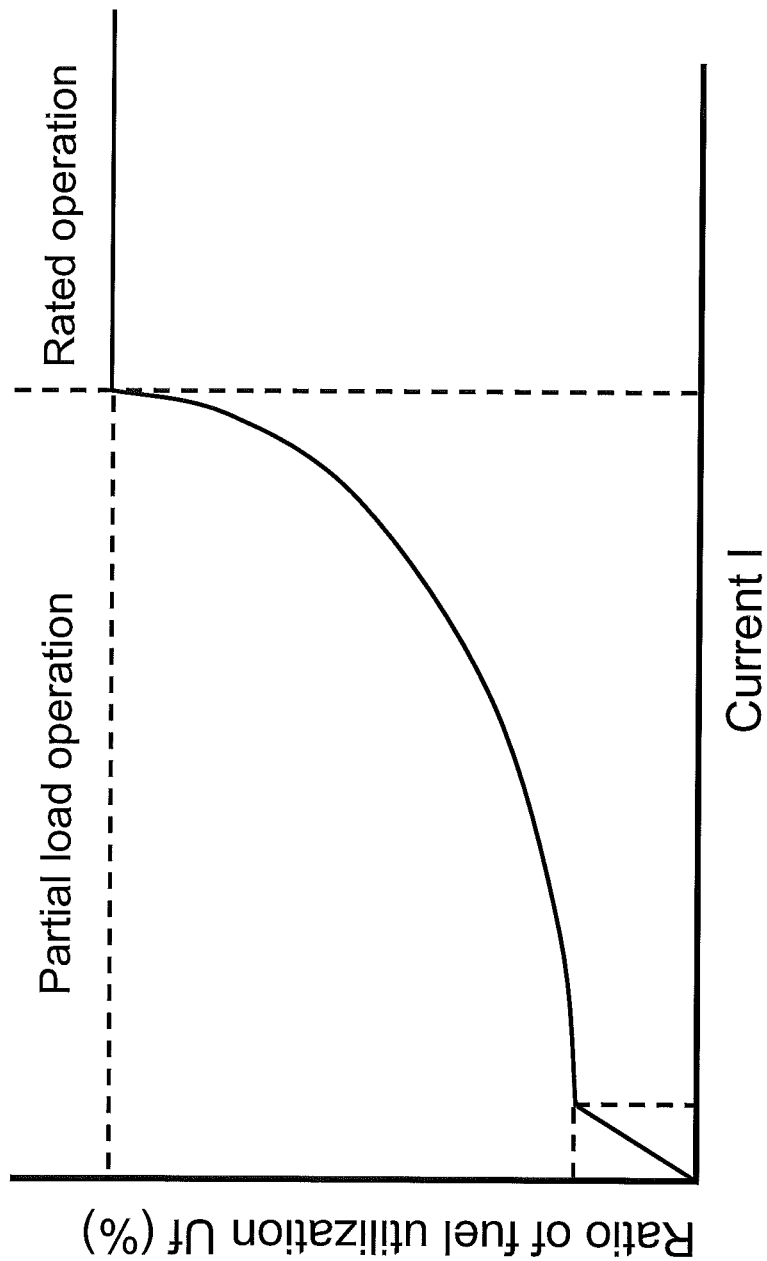
FIG. 3 is a graph illustrating a relationship between a rate of fuel utilization of a cell stack and an amount of current generated by the cell stack according to the request of the external load in a fuel cell device according to an embodiment of a present invention.

Therefore, unless the relationship between the rate of fuel utilization (Uf) and the amount of current (I) of the cell stack 1 is controlled in proper balance during the partial load operation, a danger of the power generation efficiency of the fuel cell device may decline and/or the load-following characteristic may decline. FIG. 2 to FIG. 4 are graphs illustrating the relationship between rates of fuel utilization of the cell stack 1 in the fuel cell device and the amounts of current generated by the cell stack 1 according to the request of the external load.

Since it is necessary to maintain the temperature of the fuel cells above a predetermined temperature in maintaining the operation of the fuel cell device, even if the required power of the external load is low, it may be necessary to supply the fuel gas at a predetermined amount or more to the fuel cells (cell stack 1). Hereinafter, the predetermined amount of fuel gas is referred to as the minimum flow.

In the fuel cell device according to the present embodiment, if the fuel gas supplied to the cell stack 1 during the partial load operation is the minimum flow or more, the controller 10 controls the raw fuel supply unit 2 and the power conditioning unit 9 such that the relationship between the rate of fuel utilization (Uf) of the cell stack 1 and the amount of current (I) generated by the cell stack 1 in response to the request of the external load becomes non-linear. In addition, the controller preferably controls the oxygen-containing gas supplying unit 3 together, and the same applies hereinafter.

That is to say, if the raw fuel supply unit 2 and the power conditioning unit 9 are controlled such that the relationship between the rate of fuel utilization (Uf) and the amount of current (I) of the cell stack 1 becomes linear during partial load operation, as mentioned later, it becomes difficult to carry out operations such as the operation to improve the load-following characteristic, the operation to control accidental fires when burning excess fuel gas at one end of the fuel cells.

In contrast, if the fuel gas supplied to the cell stack 1 during partial load operation is at least the minimum flow, a control of the raw fuel supply unit 2 and the adjuster 9 by the controller 10 in which the relationship between the a rate of fuel utilization (Uf) and the amount of current (I) of the cell stack 1 becomes non-linear can carry out operations such as the operation to improve the load-following characteristic, the operation to control accidental fires when burning excess fuel gas at one end of the fuel cells during the partial load operation, thereby making it possible to carry out efficient partial load operation.

If a maximum rate of fuel utilization (Uf) of the cell stack 1 during the partial load operation is the same as the rate of fuel utilization (Uf) during the rated operation of the fuel cell device, oxidation of the fuel cells may be reduced, thereby reducing damage to the fuel cells. Consequently, a fuel cell device with increased credibility may be obtained.

Then, as illustrated in FIG. 2, if fuel gas more than the minimum flow of the fuel gas supplied to the cell stack 1 is supplied to the cell stack 1 during partial load operation, when the controller 10 controls each of the fuel gas supply unit 2 and the power conditioning unit 9 such that the amount of increase in the rate of fuel utilization (Uf) of the cell stack 1 is reduced along with the increase in the amount of current (I) generated by the cell stack 1, the fuel cells may be maintained at a high temperature even if the amount of current (I) of the cell stack 1 is low, thereby improving the load-following characteristic of the fuel cell device.

Meanwhile, in the fuel cell device with a configuration in which the excess fuel gas, which was not used in generating electric power by the fuel cells, can be burned at one end of the fuel cells, the excess fuel gas may accidentally combust due to the declined amount of fuel gas supplied to the fuel cells (cell stack 1) during partial load operation.

Therefore, as illustrated in FIG. 3, if the fuel gas supplied to the cell stack 1 during partial load operation is at least the minimum flow, when the raw fuel supply unit 2 and the power conditioning unit 9 are controlled by the controller 10 such that the amount of increase of the rate of fuel utilization (Uf) increases along with the increase of amount of current (I) generated by the cell stack 1, the excess fuel gas increases when the amount of current (I) of the cell stack 1 is low. That is to say, accidental combustion of excess fuel gas may be decreased due to increase of the excess fuel gas.

In FIG. 2 and FIG. 3, the relationship between the rate of fuel utilization (Uf) of the cell stack 1 and amount of current (I) is a quadratic curve during the partial load operation when fuel gas of more than the minimum flow of fuel gas supplied to the cell stack 1 is supplied to the cell stack 1, but the relationship is not limited to the relationship expressed by the quadratic curve. It may be set appropriately according to the amount of fuel cells configuring the fuel cell device, the size of the module M, or the like, and for example, the relationship may be expressed by a cubic curve, or the like.

For example, as illustrated in FIG. 4, if the fuel gas supplied to the cell stack 1 is at least the minimum flow, the controller 10 may control the raw fuel supply unit 2 and the power conditioning unit 9 such that an amount of increase in the rate of fuel utilization (Uf) increases along with the increase in amount of current (I) generated by the cell stack 1, and subsequently, the amount of increase of the rate of fuel utilization (Uf) decreases along with the increase in amount of current (I). In such a case, the relationship between the rate of fuel utilization (Uf) and the amount of current (I) of the cell stack 1 during the partial load operation is expressed by the cubic curve.

Thereby, excess fuel gas increases in the region with low amount of current (I) of the cell stack 1 and accidental combustion of the excess fuel gas in the fuel cell device may be prevented while improving the load-following characteristic.

The relationship between the rate of fuel utilization (Uf) and the amount of current (I) of the cell stack 1 is linear until the minimum flow of fuel gas supplied to the cell stack 1 is reached.

The present invention was described in detail but the present invention is not limited to the embodiment mentioned above, and various changes, revisions, and the like, are possible within the range that does not deviate from the purpose of the present invention.

For example, if fuel gas greater than the minimum flow is supplied to the cell stack 1 during partial load operation, the controller 10 may control the raw fuel supply unit 2 and the power conditioning unit 9 such that the amount of increase in the rate of fuel utilization (Uf) decreases along with the increase in the amount of current (I) generated by the cell stack 1, and subsequently, the amount of increase in the rate of fuel utilization (Uf) increases along with the increase in the amount of current (I) generated by the cell stack 1.

What is claimed is:

1. A fuel cell device comprising:
   a cell stack comprising a plurality of fuel cells electrically coupled to generate power with a fuel gas and an oxygen-containing gas;
   a fuel gas supply unit to supply the fuel gas to the plurality of fuel cells;
   a power conditioning unit that controls the amount of electrical current that is generated by the plurality of fuel cells and that is supplied to the external load; and
   a controller configured to control each of the fuel gas supply unit and the power conditioning unit and is further configured to:
      linearly increase a rate of fuel utilization of the plurality of fuel cells with increasing the electric current when the fuel gas flow is below a minimum fuel gas flow necessary to maintain a temperature of the plurality of fuel cells above a predetermined temperature;
      non-linearly increase the rate of fuel utilization from a point of minimum fuel gas flow with increasing the electric current during a partial load operation; and
      maintaining during a rated operation the rate of fuel utilization constant with increasing the electric current.

2. The fuel cell device according to claim 1, wherein the controller is further configured to:
   decrease during the partial load operation a gradient of the rate of fuel utilization over the electric current with increasing the electrical current.

3. The fuel cell device according to claim 1, wherein the controller is further configured to:
   increase during the partial load operation a gradient of the rate of fuel utilization over the electric current with increasing the electrical current.

4. A fuel cell device comprising:
   a cell stack comprising a plurality of fuel cells electrically coupled to generate power with a fuel gas and an oxygen-containing gas;

a fuel gas supply unit to supply the fuel gas to the plurality of fuel cells; and a controller configured to control the amount of electrical current that is generated by the plurality of fuel cells and that is supplied to the external load, wherein the controller is further configured to:

linearly increase a rate of fuel utilization (Uf (%)) of the plurality of fuel cells with increasing the electric current when the fuel gas flow is below a minimum fuel gas flow necessary to maintain a temperature of the plurality of fuel cells above a predetermined temperature;

non-linearly increase the rate of fuel utilization (Uf (%)) from a point of minimum fuel gas flow with increasing the electric current during a partial load operation; and maintain the rate of fuel utilization (Uf (%)) constant with increasing the electric current during a rated operation.

5. The fuel cell device according to claim 4, wherein the controller is further configured to:

decrease during the partial load operation a gradient of the rate of fuel utilization over the electric current with increasing the electrical current.

6. The fuel cell device according to claim 4, wherein the controller is further configured to:

increase during the partial load operation a gradient of the rate of fuel utilization over the electric current with increasing the electrical current.

7. A fuel cell device comprising:

a cell stack comprising a plurality of fuel cells electrically coupled to generate an electric current (I) from a reaction of a fuel gas and an oxygen-containing gas in one of at least a first range defining a partial load operation and a second range defining a rated operation;

a fuel gas supply unit to supply the fuel gas to the plurality of fuel cells at a fuel gas flow rate from a raw fuel supply unit; and a controller configured to:

control the reaction of the fuel gas and the oxygen-containing gas and control the fuel gas flow rate to:

linearly vary a rate of fuel utilization (Uf (%)) of the plurality of fuel cells in direct proportion to the electric current when the fuel gas flow is below a minimum fuel gas flow, wherein the minimum fuel gas flow is defined as a minimum fuel gas flow sufficient to maintain a temperature of the plurality of fuel cells above a predetermined temperature;

non-linearly vary the rate of fuel utilization (Uf (%)) as a function of the current when the fuel gas flow is above the minimum fuel gas flow and the current is in the first range; and maintain the rate of fuel utilization (Uf (%)) constant when the current is in the second range.

8. The fuel cell device according to claim 7, wherein the current produced during the rated operation is higher than the current produced during the partial load operation.

9. The fuel cell device according to claim 7, wherein the controller is further configured to:

decrease, during the partial load operation, a gradient of the rate of fuel utilization over the electric current with increasing the electrical current within the first range.

10. The fuel cell device according to claim 7, wherein the controller is further configured to:

increase, during the partial load operation, a gradient of the rate of fuel utilization over the electric current with increasing the electrical current within the first range.

* * * * *